Figure 1:
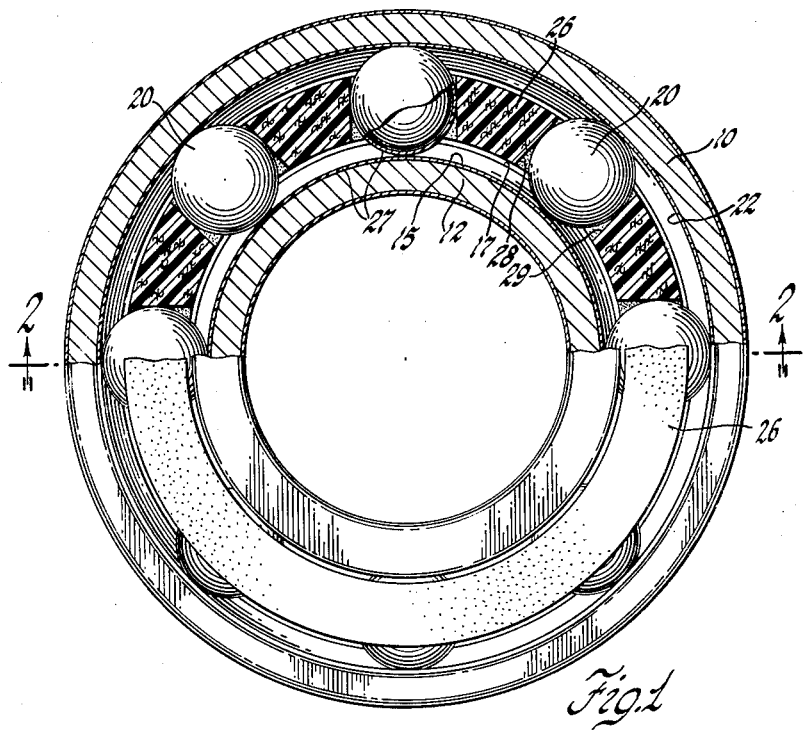

Oct. 19, 1965   W. J. MAYER ETAL   3,212,832
LUBRICATING GYRO BEARINGS
Filed Dec. 13, 1962

INVENTORS
Walter H. Lange &
BY  William J. Mayer

G. N. Shampo
ATTORNEY

United States Patent Office 3,212,832
Patented Oct. 19, 1965

3,212,832
LUBRICATING GYRO BEARINGS
William J. Mayer and Walter H. Lange, St. Clair Shores, Mich., assignors to General Motors Corporation, Detroit, Mich., a corporation of Delaware
Filed Dec. 13, 1962, Ser. No. 244,328
1 Claim. (Cl. 308—187)

This invention relates to bearing assemblies and to a method of lubricating elements of the assemblies. More particularly, this invention relates to inertial guidance gyroscope bearing assemblies lubricated with stearic acid.

The specialized problems associated with lubricating gyro rolling contact bearing assemblies have been recognized for many years. In order to function properly, a gyro must have good stability and balance characteristics in operation. This is particularly true in an inertial guidance gyroscope, where a high degree of accuracy and precision is required. Any disturbance which upsets gyro balance and stability characteristics reduces the accuracy and precision of a gyro system. Therefore, it follows that gyro bearing assemblies must have especially good balance and stability characteristics in operation.

While in operation, a gyro rolling contact bearing assembly must constantly maintain its original torque characteristic. In other words, its resistance to rolling must remain unchanged. The resistance to rolling in a bearing assembly depends to a great extent on the lubrication of the assembly. The bearing assembly must be adequately lubricated and the lubricant must have the desired lubricating qualities.

The lubricant should have proper lubricity characteristics at various conditions of temperature, pressure and load. The lubricant also must act as a protective coating for the metal elements of the bearing assembly. Therefore, the lubricant should be resistant to oxidation and other types of chemical decomposition or degradation. Otherwise these chemical changes destroy the protective coating formed by the lubricant on the bearing elements resulting in damage to the elements. These chemical changes also have an adverse effect on the balance and stability characteristics of a gyro bearing assembly. They result in the undesirable deposition of reaction products or decomposition products on the bearing elements. The buildup of these products on the bearing elements changes the resistance to rolling, which results in an unstable or unbalanced gyro condition.

Two important stability problems have been recognized in connection with the quantity of lubricant used in a gyro bearing assembly. These problems are associated with either insufficient lubrication or excess lubrication of the metal elements of the bearing assembly. In the first case, where there is an insufficient amount of lubricant on the bearing elements, the heat generated by friction between the elements causes the lubricant to thermally decompose. This decomposition results in a varnish formation on the metal elements. The buildup of varnish on the bearing elements changes the resistance to rolling, resulting in an unstable or unbalanced gyro condition.

In the second case, where there is an excess amount of lubricant on the bearing elements, the phenomenon known as "jog" occurs. In this latter instance, droplets of lubricant from the bearing accumulate in the ball-race contact area. The accumulation of lubricant causes a momentary torque change which is known as a jog. This undesirable occurrence results in an unstable or unbalanced gyro condition and is very common in gyro assemblies. Therefore, the amount of lubricant on the bearing elements and the lubricating film layer must be very carefully controlled to avoid this problem. However, the problem is very difficult to overcome when the bearing is lubricated with conventional hydrocarbon oils or greases.

Conventional oils or greases have the property of forming a lubricating film on the bearing elements which is many molecular layers in thickness. This film layer has its own inherent hydrodynamic properties. In other words, molecules of oil in the film flow. Thus, the thickness of the oil film on the surfaces of the bearing elements will vary considerably, due to the mechanical and frictional forces encountered at the surfaces of the bearing elements, particularly in the ball-race contact areas. These forces cause a substantial buildup in the thickness of the film layer in these areas. The buildup of the film in these areas may be substantial enough to cause jog. Thus, it is desirable to form a lubricating film which will retain its uniform thickness over the entire load-bearing surfaces of the bearing elements. Naturally, it is preferable to have a lubricating film which is essentially monomolecular in thickness.

It is therefore a principal object of the present invention to improve balance and stability characteristics of a gyro in operation by eliminating the problems associated with lubricating gyro bearing assemblies, such as varnish formation and the phenomenon known as "jog." It is another object of this invention to provide a gyro bearing assembly having a lubricant which is resistant to oxidation, chemical decomposition and degradation, and which will protect the metal elements of the assembly, thereby increasing the life of the assembly. It is a further object of this invention to provide a method for lubricating the rolling contact elements of a gyro bearing assembly with an essentially monomolecular layer of lubricant.

These and other objects of the present invention are achieved by a gyro bearing assembly having the rolling contact elements treated with substantially pure stearic acid to form an integral lubricating film of ferric stearate on the elements. In accordance with this invention, the contact surfaces of gyro bearing elements are lubricated by placing the elements in contact with stearic acid at a temperature above its melting point for a sufficient time to form a lubricating film of ferric stearate which is essentially monomolecular in thickness on the surfaces of the elements. After this treatment, excess stearic acid is wiped off the bearing elements. If some of this excess acid is inaccessible so that it cannot be removed by wiping, it may be eliminated by heating the elements to a temperature above the melting point of stearic acid for a time sufficient to allow the residual excess acid to run off of the elements. The bearing elements are then assembled in the usual manner.

Figure 2:
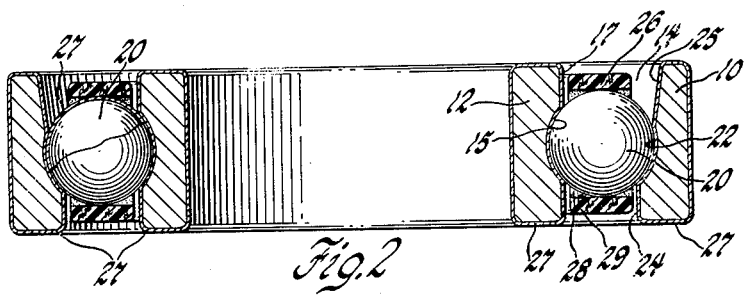

The invention will be described with reference to the accompanying drawing, in which:

FIGURE 1 is a side elevational view of a gyro ball bearing assembly with parts broken away and in section; and FIGURE 2 is a sectional view of the ball bearing assembly along the line 2—2 of FIGURE 1.

The ball bearing structure shown in FIGURE 1 includes a generally cylindrical outer race member 10 and a generally cylindrical inner race member 12, each made of any suitable bearing metal, such as an SAE 52100 steel. The inner race is coaxially aligned within and radially separated from the outer race to form an annular space 14. A circumferential raceway or groove 15 of arcuate cross section is provided in the outer cylindrical surface 17 of the inner race 12. Likewise, the outer race has a similarly shaped annular raceway or groove 22 in its inner cylindrical surface 24. A plurality of bearing balls 20 are seated snugly in these grooves and are thus maintained within the annular space 14 between the outer and inner races. The bearing balls are made of any suitable bearing metal, such as an SAE 52100 steel. Of course, the bearing balls are free to remove within the track formed by the grooves in the races. The inner cylindrical surface 24 of the outer race 10 is tapered at 25 to facilitate assembly of the elements.

The bearing balls and the outer and inner races have an essentially monomolecular lubricating film 27 of ferric stearate on their external surfaces. Of course, the thickness of the film layer is greatly exaggerated in the drawing for the purpose of illustration. The film is formed by the reaction of stearic acid with the metal surfaces of the balls and races, as is more fully explained below.

A non-metallic annular separator 26 is located within space 14. The separator is preferably made of a plastic-impregnated cloth material which has interstices further impregnated with stearic acid, as is more fully explained below. A number of cylindrical openings 28 extend radially through this separator at equally spaced locations circumferentially. The separator thus maintains the bearing balls 20, which are located in these openings in fixed positions relative to one another. The balls are in sliding frictional contact with the surfaces 29 of the separator defining the openings 28 but are free to rotate within the openings. Since the radial thickness of the separator is less than the diameter of the bearing balls, the separator is freely rotatable and supported by the balls within the space 14.

Stearic acid is a colorless, monoclinic, leaf-like solid substance at room temperatures. Pure stearic acid has a melting point of 69.4° C. and a boiling point of 383° C. It has good lubricity characteristics in either the solid or liquid state. Stearic acid is a saturated organic acid having excellent resistance to oxidation, chemical decomposition and heat degradation. As in the case of most organic acids, the carboxylic acid group in stearic acid has a replaceable hydrogen atom. Thus, stearic acid will react with metallic substances such as iron to form salts such as ferric stearate. The salts of stearic acid have lubricating qualities and chemical properties comparable to pure stearic acid.

In accordance with this invention, the separator is preferably formed of a cloth laminated thermosetting plastic material. The cloth fibers generally used in making the separator are cotton, wool, paper or other suitable material which will readily absorb stearic acid. The plastic used in forming the separator may be a resin of the phenolic, melamine or epoxy type, or other suitable thermosetting plastic materials. The body of the separator has a great number of small voids or interstices formed by the plastic resin and cloth fibers. These interstices contain entrapped air. The fibers, of course, also are porous and contain entrapped air.

As previously mentioned, the interstices in this plastic-impregnated cloth separator are filled with stearic acid. Thus, the separator functions as a reservoir for the stearic acid lubricant. When the bearing assembly is operating, the stearic acid will bleed out of the separator onto the bearing elements in contact with the separator. This bleeding action serves to provide additional lubricant on the bearing elements and to replace any of the lubricant lost from the film on the surfaces of the elements.

A vacuum impregnation technique or other appropriate means may be use to impregnate the separator with stearic acid. The vacuum impregnation step may be conveniently carried out by immersing the separator in a suitable heated vessel containing molten stearic acid. This liquid bath is maintained at a temperature above the melting point of stearic acid. The vessel is then placed in the vacuum apparatus and air is evacuated from the apparatus until the pressure is reduced to about 30 microns absolute. Under these conditions, the air contained in the small interstices and the cloth fibers of the separator body will bubble out through the stearic acid bath into the vacuum apparatus. Thus, the molten stearic acid in the bath is drawn and absorbed into the evacuated voids in the body of the separator. The vacuum impregnation should be continued until the air in the separator body is substantially replaced with molten stearic acid, after which the separator is removed from the vessel and permitted to cool in air.

The steel races and the bearing balls are also treated with stearic acid. These elements are placed in a stearic acid bath at a temperature above the melting point of stearic acid for a time sufficient to cause a reaction to take place between the acid molecules and the iron atoms at the metal surfaces of the bearing elements. In this manner, an integral lubricating film of ferric stearate, which is essentially monomolecular in thickness, is formed at the surfaces of the balls and races. It is believed that the iron atoms in the ferric stearate molecules are retained at the surfaces of the metal body of each element and that the stearate radicals of each ferric stearate molecule extend radially outwardly from the surfaces of each metal body. Thus, the film which is formed is integrated in the metal body of each element at the surface of the elements. Since this reaction takes place at a relatively slow rate, the metal races and balls should be treated for a sufficient time to ensure the formation of a complete and uniform monomolecular layer of ferric stearate on the surfaces of the elements.

At the end of this time the metal elements are removed from the acid bath and excess acid is wiped from the hot elements with tissue paper or any appropriate absorbent material. Since some of the surfaces of some of the elements are difficult to wipe off due to the configuration of the particular elements, further excess acid is removed by a subsequent heat treatment. In the latter heat treatment, the particular element may be placed on any suitable absorbent material and heated in a beaker to a temperature slightly above the melting point of stearic acid. In this manner, the residual excess acid will melt and flow from the surfaces of the bearing element onto the absorbent material. This reheating will not affect the film of ferric stearate on the elements, and an essentially monomolecular layer of ferric stearate remains at the surfaces of the metal elements. The elements are then permitted to cool and the bearing is assembled in the usual manner.

In accordance with this invention, we have lubricated a gyro bearing assembly in the above manner. A plastic-impregnated cotton cloth separator was immersed in a beaker containing molten stearic acid at a temperature of about 70° C. The separator was impregnated with stearic acid by placing the vessel in a vacuum apparatus at an absolute pressure of about 30 microns for about one-half hour. At the end of this time, the separator was removed from the bath, and excess acid on the surfaces of the separator was wiped off with tissue paper. The steel balls and outer and inner races were immersed in a beaker containing liquid stearic acid at approximately 100° C. for about two days. An integral film of ferric stearate, essentially monomolecular in thickness, was thereby formed on the surfaces of these elements. At the end of this time, the balls and races were removed from the bath and excess acid was wiped off the surfaces of the elements with tissue paper. Further excess acid was removed by placing the metal balls and races on filter paper in a beaker and heating them to about 100° C. for about one-half hour. The elements were subsequently cooled and assembled in the usual manner.

Of course, the processing conditions may be varied somewhat from those set forth in the above example and still produce the desired results. We have found that the vacuum impregnation of the separator may be carried on at any temperature between the melting point and boiling point of stearic acid. Also, we have found that by treating the metal balls and races with liquid stearic acid at temperatures close to the boiling point of stearic acid, the time required to form the monomolecular film of ferric stearate at the surfaces of the elements is reduced. This is to be expected, since the chemical reaction rate would be increased at higher temperatures. However, in order to obtain the desired uniform film on the surfaces of the elements, we have found that this treatment should be carried on for several hours even at temperatures close to the boiling point of stearic acid. The film of ferric stearate also may be formed by subjecting the bearing elements to a gaseous stearic acid treatment at temperatures above the boiling point of stearic acid. However, it is preferable to use a liquid bath treatment, since the stearic acid will decompose if maintained for long periods of time at temperatures above the boiling point.

Comparison wear tests were conducted on steel bearings lubricated with stearic acid by the above procedure and on bearings lubricated in the conventional manner with conventional hydrocarbon lubricating oils. The bearings used in these tests had an outer diameter of 1.0236 inch, a bore of 0.397 inch and eight balls of $3/16$ inch diameter. The inner and outer races were made of SAE 52100 steel, and the balls were made of SAE 51100 steel. In each test, radioactive bearing elements were used and the radioactivity of the bearing assembly per unit weight was measured. Each bearing was placed in a standard gyro test fixture and tested under the same operating conditions of speed, temperature, pressure and load for periods up to 100 hours. In each test, measurements of the radioactivity of bearings being tested were taken at predetermined intervals of time. These measurements were related to the weight loss of the bearings as a function of time. The results of these tests were then compared.

The test results for bearings lubricated with stearic acid demonstrated an average cumulative wear approximately one-half of that shown for bearings lubricated with conventional oils. The average cumulative wear for the bearings lubricated with stearic acid measured as weight loss in micrograms for 100 test hours of operation was 40 micrograms. The average cumulative wear for bearings lubricated with conventional lubricating oils for 100 test hours of operation was 78 micrograms. Similar comparison tests were conducted on smaller bearings lubricated with conventional oil and with stearic acid by the above procedure. In these latter tests, the bearings had an outer diameter of $5/8$ inch, a bore of $1/4$ inch and nine balls of $3/32$ inch diameter. The races were made of SAE 52100 steel and the balls of SAE 51100 steel. The results of these tests showed an average cumulative wear of 10 micrograms for the bearings lubricated with oil, while the bearings lubricated with stearic acid by the above procedure showed an average cumulative wear of 5 micrograms. These test results were also for 100 hours of operation. Thus, these tests proved the excellent wear resistance of bearings lubricated with stearic acid by the above procedure.

There are numerous other advantages which are realized by lubricating ball bearings with stearic acid in the above manner as opposed to lubricating bearings with conventional hydrocarbon oils or greases. The total amount of lubricant necessary to adequately lubricate the bearing assembly with stearic acid is far less than the amount necessary to adequately lubricate a bearing with a conventional oil or grease. Since there is a less total lubricant, there is less of a tendency for the lubricant to bleed out of the bearing assembly to the gyro float and thereby cause unbalance. Likewise, jogs, due to uneven accumulations of oil in the running track, are greatly reduced. Stearic acid and ferric stearate are far more resistant to oxidation, chemical decomposition and degradation than conventional hydrocarbon oils. Therefore, the undesirable formation of decomposition products on the bearing elements is substantially reduced. While these advantages are particularly valuable in lubricating inertial guidance gyro ball bearings, they are also very desirable in lubricating other types of bearings, such as roller bearings, needle bearings and the like.

Although the present invention has been described in connection with certain specific examples thereof, it is not to be limited thereby except as defined in the appended claim.

We claim:

In a high speed gyroscope ball bearing assembly having a generally cylindrical steel outer race member, a generally cylindrical steel inner race member coaxially aligned within and radially separated from said outer race member, a plurality of steel bearing balls positioned in the annular space formed between said outer and inner race members, said balls being in rolling relation with said outer and inner race members and providing for relative coaxial rotation of said race members, a porous separator positioned within said space to maintain said balls at fixed circumferential positions relative to one another, the improvement comprsing an integral uniform lubricating film of ferric stearate on said elements and on said race members adjacent to said balls, said film being monomolecular in thickness, and said separator being impregnated with stearic acid to provide additional lubricant to the surfaces of said balls and said race members to maintain the uniform monomolecular film during high speed operation.

References Cited by the Examiner

UNITED STATES PATENTS

| | | | |
|---|---|---|---|
| 1,982,347 | 11/34 | Large | 308—201 |
| 2,035,417 | 3/36 | Allendorff | 308—201 |
| 2,379,478 | 7/45 | Delp | 308—240 |
| 2,609,256 | 9/52 | Baker | 308—188 |
| 2,673,818 | 3/54 | Woog | 117—89 |
| 2,726,978 | 12/55 | Skinner | 29—149.5 |
| 2,752,209 | 6/56 | Acterman | 308—172 |
| 2,782,078 | 2/57 | Wright | 308—189 |
| 2,921,865 | 1/60 | Kubie | 117—89 |
| 2,987,350 | 6/61 | Hay | 308—201 |
| 3,001,837 | 9/61 | Lamson | 308—188 |

FOREIGN PATENTS

| | | |
|---|---|---|
| 283,542 | 5/28 | Great Britain. |
| 657,532 | 9/51 | Great Britain. |

DON A. WAITE, *Primary Examiner.*

ROBERT C. RIORDON, FRANK SUSKO, *Examiners.*